UNITED STATES PATENT OFFICE.

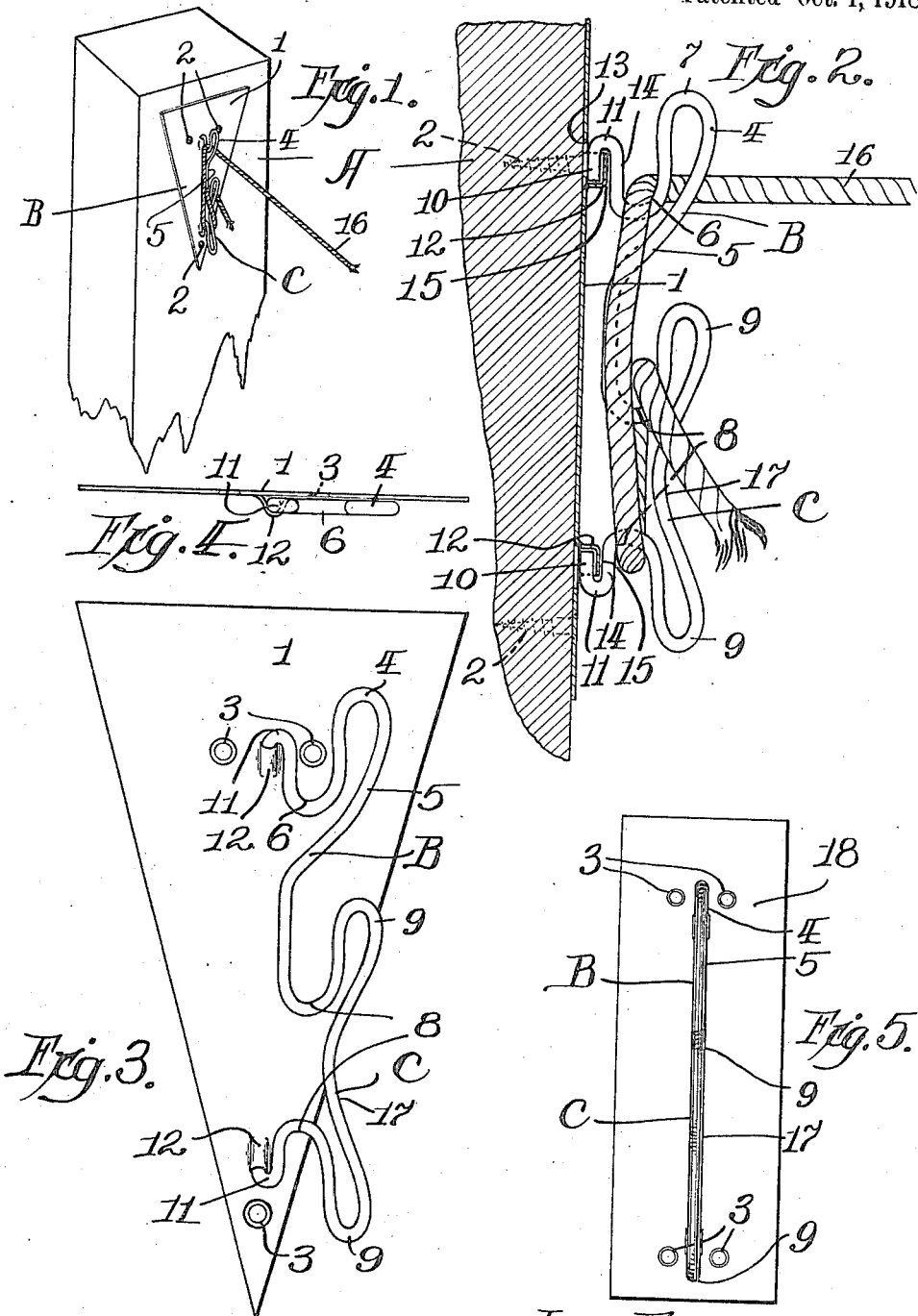

JOHN T. CANNON, OF ST. PAUL, MINNESOTA.

LINE HOOK AND HOLDING MEANS.

1,280,393.  Specification of Letters Patent.  Patented Oct. 1, 1918.

Application filed March 3, 1917. Serial No. 152,186.

*To all whom it may concern:*

Be it known that I, JOHN T. CANNON, a citizen of the United States, residing at St. Paul, in the county of Ramsey and State of Minnesota, have invented a new and useful Improvement in Line Hook and Holding Means, of which the following is a specification.

My invention relates to a line hook and holding means whereby a line can be stretched to the proper tension and then wrapped across the holding means thereby preventing the line from slipping back on the hook and becoming loose.

It is an object of my invention to have the line hook and holding means pivotally secured to a fastening plate so that it can be turned on its pivot points to lie flat on the fastening place. The pivoting of the hook and holding means allows the same to be shipped in a convenient and compact form. A further object of my device is to have the holding means directly under the line hook and the hook and holding means formed of a single piece of wire.

The construction and shape of my device is such that it will not tear or cut the line when secured to the same. Devices heretofore designed to hold a line have been more or less impractical and not satisfactory, in many instances for the reason that they tear or injure the line.

In the drawing which forms part of the specification:

Figure 1 is a perspective of the upper end of a square clothes pole with my line hook and holding means secured to the same as it would appear in use.

Fig. 2 is a side elevation, showing the holding plate and a portion of the post in cross section.

Fig. 3 is a front elevation illustrating the hook and holding means lying flat against the holding plate.

Fig. 4 is a plan view of Fig. 3.

Fig. 5 illustrates an alternative shape of holding plate.

In the drawing, A represents an ordinary clothes pole, only the upper portion being illustrated. B illustrates my line holding device which is preferably formed with a triangular plate of thin sheet material 1, and is adapted to be secured to the post A by means of screws 2 which pass through the openings 3 formed in the plate 1.

A hook 4 is formed of a single piece of wire 5 which is bent to form the recess 6 and loop 7. The wire 5 is also bent to extend directly below and in line with the hook 4 to form recesses 8 and loops 9, which form a holding means C. The holding means C lies in a vertical plane with the hook 4.

The ends 10 of the wire 5 are bent backward to form U shaped engaging ends 11 which are adapted to freely engage in the sockets 12 so as to pivotally hold the hook 4 in the holding means C to the plate 1. The sockets 12 are formed by cutting the plate 1 at 13 and pressing the plate inward sufficiently to make the proper sized semicircular sockets 12 to receive the ends 10 of the wire 5.

The ends 10 are bent so as to lie parallel with the portions 14 of the wire 5 just leaving sufficient openings 15 between the ends 10 and the portions 14 slightly larger than the thickness of the plate 1 and to allow the hook 4 and holding means C to be held freely pivoted in the sockets 12.

When in use the plate 1 is adapted to be secured to a post A or other stationary object by means of screws 2 and the line 16 brought through the recess 6 of the hook 4 and pulled to the proper tension. The free end of the line 16 then being brought around the holding means C or the loop 9 and into the recesses 8.

When the line is brought into engagement with the holding means C, it can be crossed a sufficient number of times to securely hold the same. A depression 17 being formed in the holding means centrally between the loops 9 which allows the crossing of the rope or line 16 when it is desired. Thus the rope can be wrapped in any convenient form about the holding member C. In use, it will readily be seen that a child can tighten a line and wrap it about the holding member C sufficiently so that the line 16 will be held at the desired tension.

In the use of the ordinary hooks, it is impossible to stretch the line sufficiently taut without having it slip backward when stretching it from hook to hook or wrapping it over the hook without considerable trouble. Thus the ordinary holding hooks are not very desirable for use in holding clothes lines, etc.

With this device the simplicity makes it practical and it can be easily used by anyone.

The pivoting of the hook and holding member C allows the hook to be easily adjusted to various angles from the post when the line is stretched back and forth between a series of hooks.

The alternative construction of holding plate illustrated in Fig. 5 is of rectangular shape and the hook and holding means is of the same construction and shape as that illustrated in Figs. 1, 2 and 3 being pivoted to the plate 18 in the same manner as to the plate 1. The rectangular plate 18 is adapted to be secured to the post A or other holding means by means of four screws which pass through the openings 3 in the plate.

In the preferred construction, the plate 1 is held by three screws, two of which are positioned near the upper portion of the plate and on either side of the hook 4 so as to take the main pull on the hook 4. The lower hole 3 is centrally located near the apex of the triangular plate and is sufficient to hold the plate 1 against the stress that would come on the same in use.

It will be noted that the rope 16 can be passed over the hook 4 and back and forth over the holding means C and then up again over the recess of the hook 4 and from there to another hook or series of hooks without losing any of the tension on the line 16 between the hooks.

In accordance with the patent statutes, I have described the principles of operation of my invention, together with the apparatus which I now consider to represent the best embodiment thereof, but I desire to have it understood that the construction is only illustrative and that the invention can be carried out by other means and applied to uses other than those set forth within the scope of the following claims.

I claim—

1. In a device of the class described, a line hook and locking means formed from a single piece of wire, U shaped engaging ends formed on each end of said wire, a plate formed of thin sheet material and sockets formed integral with said plate, whereby said U shaped ends are adapted to engage in said sockets to pivotally hold said line hook and locking means substantially as described.

2. In a device of the class described, having a line hook and locking means formed from a single piece of wire, said hook being positioned above and directly in line with said locking means so that said hook and locking means will lie in a single plane and a plate having means formed integral therewith for pivotally holding said hook and locking means for the purposes specified.

JOHN T. CANNON.

Copies of this patent may be obtained for five cents each, by addressing the "Commissioner of Patents, Washington, D. C."